Jan. 22, 1952  J. W. ORENDORFF  2,583,011
BEET TOPPER

Filed Aug. 19, 1949  2 SHEETS—SHEET 1

Inventor
John W. Orendorff
Paul O. Pippel
Atty

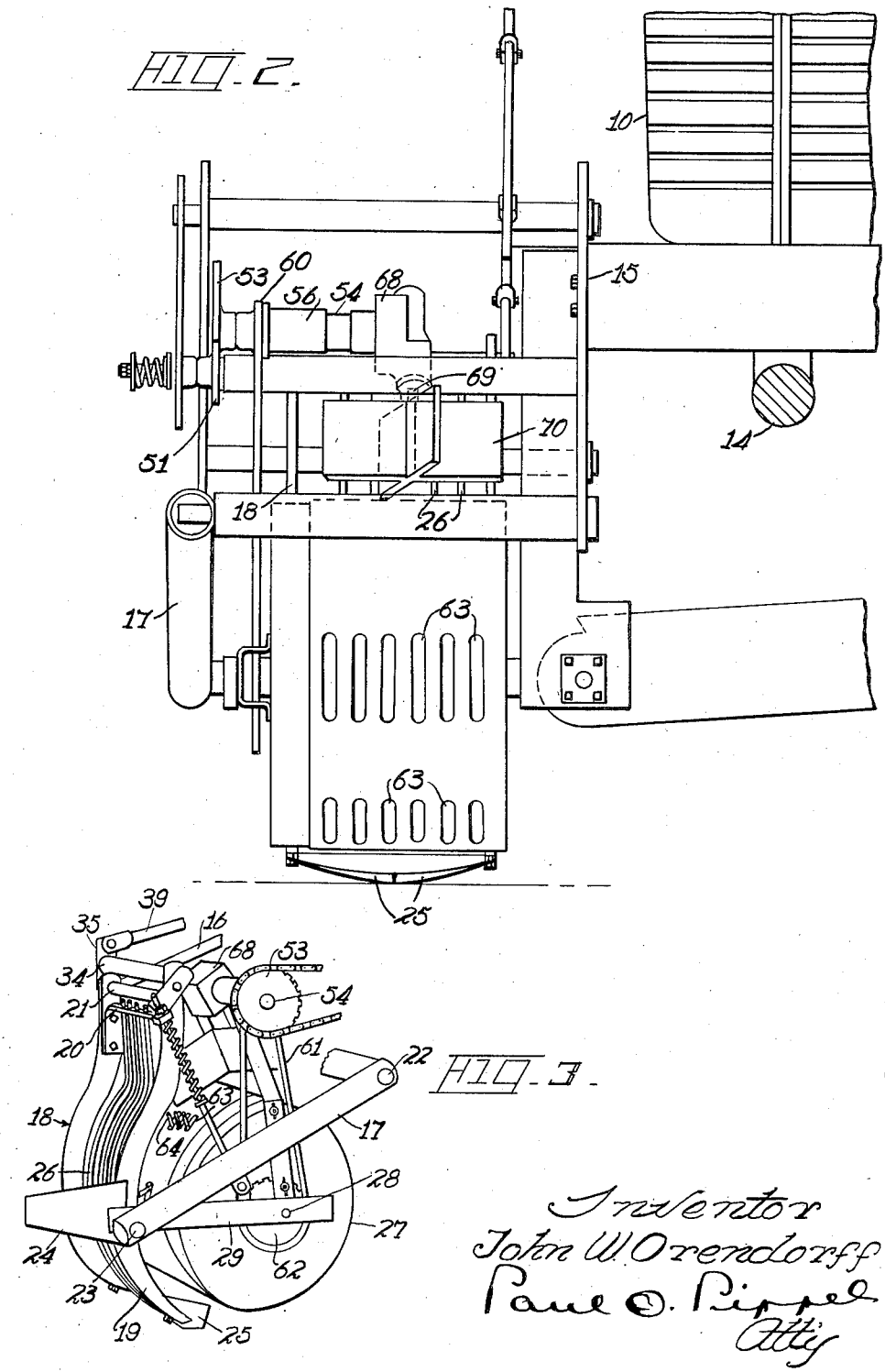

Patented Jan. 22, 1952

2,583,011

UNITED STATES PATENT OFFICE 2,583,011

BEET TOPPER

John W. Orendorff, Canton, Ill., assignor to International Harvester Company, a corporation of New Jersey Application August 19, 1949, Serial No. 111,241

9 Claims. (Cl. 56—121.45)

This invention relates to agricultural implements and particularly to beet harvesters. More specifically the invention relates to a topping mechanism for removing the foliage from beets and the like. The invention concerns particularly a novel feeler gauge and knife assembly wherein the feeler gauge, which determines the amount of crown to be severed from the beet, is in the form of a drum having members projecting therefrom adapted to engage the severed beet tops and convey them to a point of discharge by means of a flinger.

The principal object of the invention is therefore the provision of a simple and efficient topping mechanism for beets and the like which is adapted to sever the crown from the beet efficiently and to satisfactorily dispose of the tops.

Another object of the invention is to provide a cylindrical feeler gauge having pick-up fingers projecting from the periphery thereof which is adapted to perform the dual function of gauging the amount of top to be removed from the beet and likewise carrying the tops after they are severed by the associated knife to a position for discharge out of the path of the digger blades by which the beets are removed from the soil.

Other objects and advantages will become clear after a consideration of the following detailed description in conjunction with the accompanying drawings, wherein:

Figure 2 is a front elevation of the structure shown in Figure 1 with the tractor front wheels removed; and Figure 3 is a view in perspective showing the main parts of the cutting blade and the top disposal unit.

Figure 1:
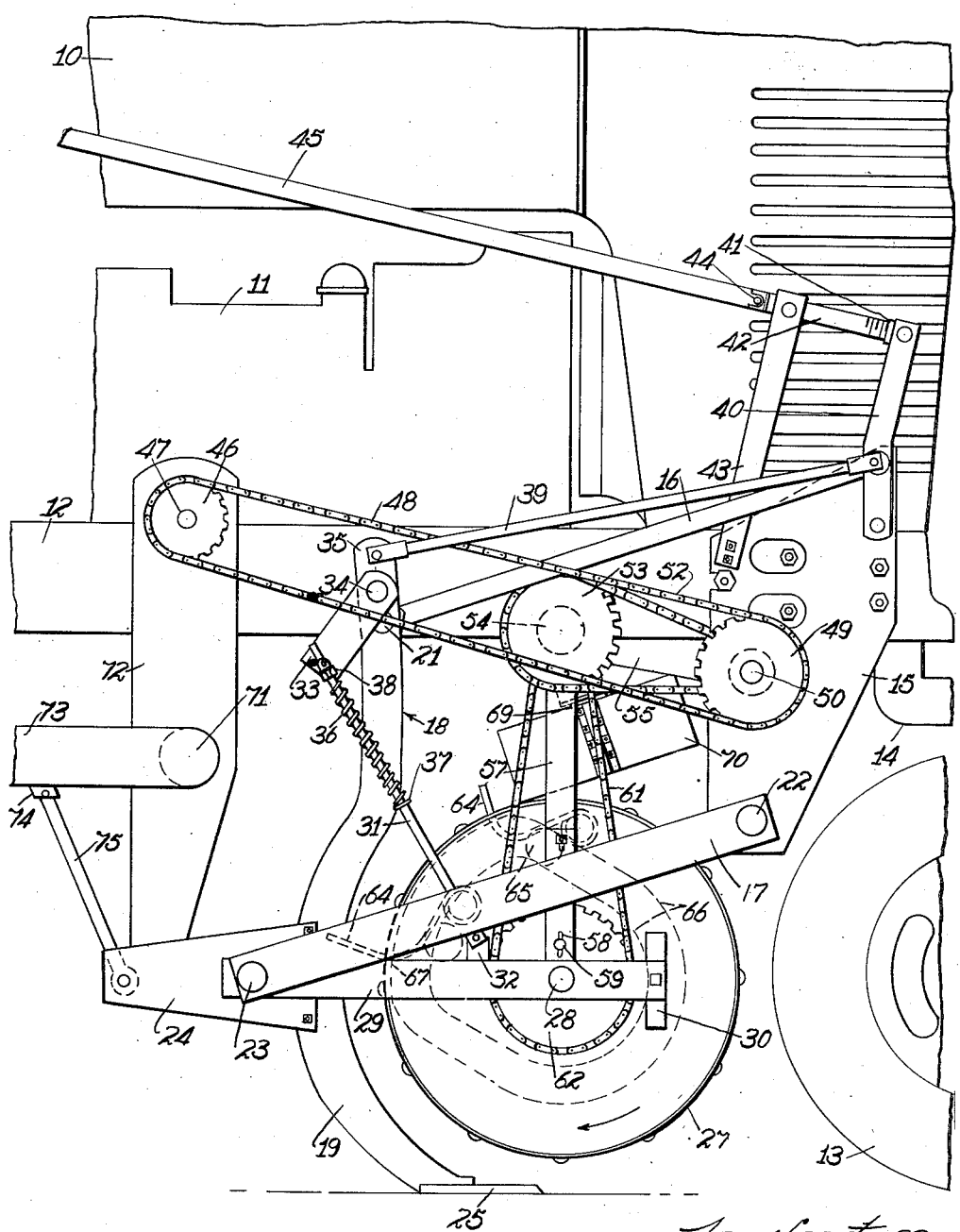
Figure 1 is a view in side elevation of the front end of a tractor having mounted thereupon a beet topping mechanism embodying the features of the present invention.

Referring to the drawings, the numeral 10 designates the body of a tractor having a power plant 11 and a side sill 12. The front end of the tractor is supported upon a dirigible wheel 13 carried by an axle 14.

Secured to the sill 12 at the front end of the tractor and depending therefrom is a plate 15 having pivotally mounted thereupon vertically spaced generally parallel links 16 and 17. The rear end of link 16 is pivotally mounted upon the upper end of a vertically extending standard 18 having an arcuately shaped lower portion 19. Standard 18 comprises laterally spaced members, as shown in Figure 3, secured together at their upper ends by a cross brace 20. Pivotal mounting of the upper link 16 upon the standard 18 is provided by a transversely extending pin 21 mounted in openings provided in the upper ends of said standards. The lower link 17 is pivotally mounted at its forward end upon a transversely extending shaft 22 secured at its inner end to the lower portion of the plate 15. The rear end of link 17 is pivoted at 23 upon a triangular plate member 24 affixed to the standard 18 and extending rearwardly therefrom. The lower ends of the curved portions 19 of standard 18 are provided with knife elements 25 for severing the crown from beets during the passage of the tractor across a field, and a plurality of laterally spaced guide rods 26 conforming to the shape of the standards 18 extend parallel thereto, their upper ends being carried by the cross members 20 and the lower ends being secured to the knife members 25.

The thickness of crown to be removed from the beet by the cutting knives 25 is determined by a feeler gauge in the form of a cylindrical drum 27. Drum 27 is journaled upon a transversely extending shaft 28 secured to a longitudinally extending supporting bar 29, the rear end of which is pivotally mounted at 23 upon the plate 24 and the forward end of which is connected to a bracket 30 affixed to the end wall of the drum 27.

The drum is further supported with respect to the standard 18 by a rod 31 pivoted at its lower end to a lug 32 affixed to the bar 29 and at its upper end to the other end of an arm 33 mounted upon a transversely extending shaft 34 parallel to the shaft 21 and secured at one end to one of the standard members 18 and at its other end to an arm 35 which is mounted at its lower end upon the shaft 21. Rod 31 is surrounded by a spring 36 which abuts a collar 37 at one end and at its other end a nut 38 to yieldingly resist upward movement of the drum with respect to the knife 25. Adjustment in the vertical position of the drum 27 with respect to the knife 25 may be made by swinging the arm 33 to raise or lower the rod 31. This is accomplished by mechanism including a rod 39 pivoted at one end to the upper end of the arm 35 and at its other end intermediate the ends of an upright lever 40 pivotally mounted at its lower end upon the plate 15. The upper end of lever 40 is supplied with a swivel 41 adapted to receive a threaded rod 42 supported upon a bracket 43 carried by the plate 15. The other end of the rod 42 projecting beyond the bracket 43 is connected by a universal joint 44 with a rod 45 which extends to a location accessible to the operator of the tractor upon which the topping unit is mounted and is rotatable to swing the lever 40. Swinging of the lever 40, of course, rocks the shaft 34 and arm 33 to raise or lower lift rod 31.

The drum is driven in the direction of the arrow in Figure 1 by mechanism including a sprocket wheel 46 mounted upon a shaft 47 supported by the tractor and driven in a manner not shown from the power take-off shaft thereof. Sprocket wheel 46 is drivingly connected by a chain 48 with a sprocket wheel 49 journalled upon a transverse shaft 50 secured at its inner end to the plate member 15. Drivingly connected with the sprocket wheel 49 is another sprocket wheel 51 having trained therearound a chain 52, the other end of which is trained around a sprocket wheel 53 mounted upon a shaft 54 carried at the end of an arm 55 supported at its forward end upon a sleeve 56 mounted upon the shaft 50. Arm 55 and sprocket wheel 53 thus are capable of generally vertical swinging movement about shaft 50 as a center.

The upper end of a vertically extending strap 57 is journalled upon the transverse shaft 54 and the lower end thereof is secured to the supporting bar 29. Strap 57 is formed of overlapping pieces slotted as at 58 to receive a pin 59 to accommodate relative movement of the overlapping parts.

Likewise drivingly connected to the sprocket wheel 53 is another sprocket wheel 60 which is connected by a chain 61 with a sprocket wheel 62 mounted upon the shaft 28 and drivingly associated with the drum 27.

The drum 27 is of the disappearing finger type and is provided with a plurality of laterally spaced slots 63 circumferentially spaced about the periphery of the drum. Fingers 64 project through the slots 63 from the interior of the drum and are arranged and driven in a manner well known in the art. For example, in Fig. 1 it may be noted in dotted lines that each finger 64 is mounted upon a roller 65 which is adapted to ride in a track 66 carried by the interior of the drum. Track 66 is a cam track which surrounds the shaft of the drum and is provided with a camming surface 67 operable at a suitable location during the rotation of the drum to cause the fingers 64 to project farthest from the periphery of the drum. As will be noted in Figure 1, one of fingers 64 is beginning to disappear within the periphery of the drum as it approaches the upper portion of the drum. The fingers are carried along during the rotation of the drum and rotated therewith.

The drum 27 is adapted to engage the crown of the beets during passage of the topping unit over the ground and to determine the amount of crown to be severed therefrom by the knives 25 depending upon the size of the beet and the height that it projects above the ground, the drum being flexibly mounted so that some movement therebetween and the knives 25 is provided.

Also mounted upon the shaft 54 is a housing 68 enclosing gearing of conventional form for transmitting motion from shaft 54 to a generally downwardly extending shaft 69. Shaft 69 extends downwardly and forwardly and has secured thereto a plurality of vanes 70 arranged at right angles to one another. As will observed from Figure 1, the vanes extend to a location adjacent the upper peripheral surface of the drum and serve a purpose which will hereinafter be described.

It has already been pointed out that the drum 27 gauges the amount of crown to be severed from the beet by the knives 25. It will be noted that the knives 25 extend forwardly to a position almost below the center of the drum 27 and that the portions 19 of the standards 18 are made arcuate to conform to the shape of the drum 27. The tops when they are severed from the beets are picked up by the fingers 64 and during rotation of the drum are carried upwardly between the drum and the guide bars 26 to a location adjacent the vanes 70, at which point the fingers 64 recede within the drum and the tops carried upwardly thereby are flung laterally away from the drum by means of the rotating vanes 70. The shaft 69 and vanes 70 being mounted upon the arm 55 move upwardly with the drum 27 about the shaft 50 as a center. A manual adjustment of the position of the drum relative to the knives 25 may be made when the topping unit is inoperative by adjusting the rod 31 and the spring 36 thereupon. The latter also provides a yielding connection between the standard and the drums to facilitate passage of beet tops therebetween.

Raising and lowering of the topping unit with respect to the tractor to move the unit between operating and transport positions is accomplished by mechanism including a transverse rock shaft 71 mounted in one or more brackets 72 supported from the side of the tractor. Shaft 71 is provided with an arm 73 having a lug 74 thereon connected by a link 75 with the member 24. Shaft 71 is rocked by conventional means, not shown, preferably deriving power from the tractor power plant.

It is believed that the operation of the beet topping unit of the present invention will be clearly understood from the foregoing description. It should be understood also that the invention has been described only in its preferred embodiment and that modifications may be made therein without departing from the spirit thereof or the scope of the appended claims.

What is claimed is:

1. Topping mechanism for beets and the like adapted to be mounted upon a tractor comprising a rotary drum mounted on the tractor for vertical movement with respect thereto and adapted to travel upon the beets in a row to gauge the position of the topping blade and determine the amount of crown to be severed from the beets, a standard rearwardly of said drum and mounted for vertical movement therewith, said standard having a portion spaced from and curved to conform to the shape of the periphery of the drum, a knife blade carried at the lower end of the standard and extending to a location beneath the drum and spaced therefrom, pick-up fingers projecting from the periphery of the drum to engage the beet tops and convey them upwardly to the top of the drum, said standard being of a width substantially equal to the width of the drum to confine the beet tops between the standard and the drum, and a flinger above the drum in the path of the beet tops arranged to discharge the beet tops laterally of the drum.

2. Topping mechanism for beets and the like adapted to be mounted upon a tractor comprising a rotary drum mounted on the tractor for vertical movement with respect thereto and adapted to travel upon the beets in a row to gauge the position of the topping blade and determine the amount of crown to be severed from the beets, a standard rearwardly of said drum and mounted for vertical movement therewith, said standard having a portion spaced from and curved to conform to the shape of the periphery of the drum, a knife blade carried at the lower end of the standard and extending forwardly to a location beneath the drum and spaced therefrom, pick-up fingers projecting from the periphery of the drum to engage the beet tops and convey them upwardly to the top of the drum, said standard being of a width substantially equal to the width of the drum to confine the beet tops between the standard and the drum, and a flinger above the drum in the path of the beet tops arranged to discharge the beet tops laterally of the drum, said pick-up fingers being arranged to rotate with the drum and to recede within the periphery thereof upon reaching a location adjacent said flinger.

3. Topping mechanism for beets and the like adapted to be mounted upon a tractor comprising a rotary drum mounted on the tractor for vertical movement with respect thereto and adapted to travel upon the beets in a row to gauge the position of the topping blade and determine the amount of crown to be severed from the beets, a standard rearwardly of said drum and mounted for vertical movement therewith, said standard having a portion spaced from and curved to conform to the shape of the periphery of the drum, a knife blade carried at the lower end of the standard and extending forwardly to a location beneath the drum and spaced therefrom, pick-up fingers projecting from the periphery of the drum to engage the beet tops and convey them upwardly to the top of the drum, a plurality of guide rods extending substantially the width of the drum associated with said standard and shaped to conform to the shape of said standard to confine the beet tops between the rods and the drum, and a flinger above the drum in the path of the beet tops arranged to discharge the beet tops laterally of the drum.

4. Topping mechanism for beets and the like adapted to be mounted upon a tractor comprising a rotary feeler drum having vertical movement with respect to the tractor and adapted to travel upon the beets in a row to gauge the position of the topping blade and determine the amount of crown to be severed from the beets, a cutting blade associated with the feeler drum for severing the top from the beets engaged by the drum, pick-up fingers projecting from the periphery of the drum to engage and convey the beet tops to the top of the drum, said fingers being arranged to recede within the periphery of the drum during rotation thereof to release the beet tops, and means for discharging the beet tops laterally from the drum.

5. Topping mechanism for beets and the like adapted to be mounted upon a tractor comprising a rotary feeler drum having vertical movement with respect to the tractor and adapted to travel upon the beets in a row to gauge the position of the topping blade and determine the amount of crown to be severed from the beets, a cutting blade associated with the feeler drum for severing the top from the beets engaged by the drum, pick-up fingers projecting from the periphery of the drum to engage and convey the beet tops to the top of the drum, guide means associated with the drum and spaced therefrom to guide and confine the beet tops while the latter are being conveyed by the drum around its periphery to a place of discharge, and a driven finger adjacent the periphery of the drum for discharging the beet tops laterally therefrom, said fingers being arranged to recede within the periphery of the drum at the discharge point to facilitate removal of the beet tops by the flinger.

6. Topping mechanism for beets and the like adapted to be mounted upon a tractor comprising a rotary feeler drum having vertical movement with respect to the tractor and adapted to travel upon the beets in a row to gauge the position of the topping blade and determine the amount of crown to be severed from the beets, a cutting blade associated with the feeler drum for severing the top from the beets engaged by the drum, pick-up fingers projecting from the periphery of the drum to engage and convey the beet tops to the top of the drum, guide means associated with the drum and spaced therefrom to guide and confine the beet tops while the latter are being conveyed by the drum to a place of discharge, a driven finger adjacent the periphery of the drum for discharging the beet tops laterally therefrom, said fingers being arranged to recede within the periphery of the drum at the discharge point to facilitate removal of the beet tops by the flinger, and means providing a yielding connection between the drum and the guide means to facilitate passage of the beet tops therebetween.

7. Topping mechanism for beets and the like adapted to be mounted upon a tractor comprising a rotary feeler gauge having vertical movement with respect to the tractor and adapted to travel upon the beets in a row to gauge the position of the topping blade and determine the amount of crown to be severed from the beets, a standard mounted rearwardly of the drum having a cutting blade carried thereby for severing the tops from the beets, pick-up means carried by the gauge for conveying the beet tops, guide means associated with the standard adjacent the rear portion of the gauge to guide the tops in a path around the gauge and confine them between the gauge and the guide means, and finger means for discharging the tops laterally from the gauge, said guide means comprising vertically extending laterally spaced rods shaped to conform to the shape of said rotary gauge.

8. Topping mechanism for beets and the like adapted to be mounted upon a tractor comprising a rotatable drum adapted to travel upon the beets in a row, a blade support rearwardly of the drum, a cutting blade carried by said support, said blade extending forwardly to a position below and vertically spaced from said drum whereby the drum serves as a gauge to determine the thickness of crown to be removed from the beet by the cutting blade, vertically extending guide means associated with said blade support shaped to conform to the curvature of said drum, pick-up fingers arranged to project outwardly through openings formed in the periphery of the drum to carry the severed beet tops upwardly between the drum and said guide means and to recede within the drum during rotation thereof, and driven flinger means adjacent the point of recession of the fingers within the drum for discharging the beet tops therefrom.

9. Topping mechanism for beets and the like adapted to be mounted upon a tractor comprising a rotatable drum adapted to travel upon the beets in a row, a blade support rearwardly of the drum, a cutting blade carried by said support, said blade extending forwardly to a position below and vertically spaced from said drum whereby the drum serves as a gauge to determine the thickness of crown to be removed from the beet by the cutting blade, vertically extending guide means associated with said blade support shaped to conform to the curvature of said drum, pick-up fingers arranged to project outwardly through openings formed in the periphery of the drum to carry the severed beet tops upwardly between the drum and said guide means and to recede within the drum during rotation thereof, driven flinger means adjacent the point of recession of the fingers within the drum for discharging the beet tops therefrom, and means providing a yielding connection between the drum and said guide means to facilitate passage of the beet tops therebetween.

JOHN W. ORENDORFF.

REFERENCES CITED

The following references are of record in the file of this patent:

UNITED STATES PATENTS

| Number | Name | Date |
| --- | --- | --- |
| 1,044,472 | Appleby | Nov. 19, 1912 |
| 1,879,905 | Liebfried | Sept. 27, 1932 |
| 2,337,698 | Walz | Dec. 28, 1943 |